United States Patent
Xu et al.

(10) Patent No.: US 11,872,696 B2
(45) Date of Patent: Jan. 16, 2024

(54) REDUNDANT PARALLEL MECHANISM WITH LESS ACTUATION AND MULTI-DEGREE-OF-FREEDOM OUTPUTS AND CONTROL METHOD THEREOF

(71) Applicant: YANSHAN UNIVERSITY, Qinhuangdao (CN)

(72) Inventors: Yundou Xu, Qinhuangdao (CN); Yiming Zhang, Qinhuangdao (CN); Yongsheng Zhao, Qinhuangdao (CN); Xiaoyu Pang, Qinhuangdao (CN); Shenglong Nie, Qinhuangdao (CN); Pengyang Gao, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 0 days.

(21) Appl. No.: 17/540,154

(22) Filed: Dec. 1, 2021

(65) Prior Publication Data
US 2022/0234192 A1 Jul. 28, 2022

(30) Foreign Application Priority Data
Jan. 28, 2021 (CN) .......................... 202110116056.3

(51) Int. Cl.
*B25J 9/00* (2006.01)

(52) U.S. Cl.
CPC ........... *B25J 9/0054* (2013.01); *B25J 9/0072* (2013.01)

(58) Field of Classification Search
CPC .... B25J 9/0054; B25J 9/0057; B25J 17/0216; B25J 9/0072; B25J 9/123; B25J 19/0004
See application file for complete search history.

(56) References Cited

U.S. PATENT DOCUMENTS

| | | | | |
|---|---|---|---|---|
| 5,354,158 A | * | 10/1994 | Sheldon | G05B 19/4015 409/145 |
| 5,656,905 A | * | 8/1997 | Tsai | B25J 17/0266 901/41 |

(Continued)

FOREIGN PATENT DOCUMENTS

| | | | | |
|---|---|---|---|---|
| CN | 1586806 A | * | 3/2005 | B25J 17/0266 |
| CN | 105834576 A | | 8/2016 | |

(Continued)

OTHER PUBLICATIONS

DE 102017002787 A1 (Wingolf Jahn) Jan. 1, 2013 (full text). [online] [retrieved on Jun. 1, 2023. Retrieved from: Clarivate Analytics. (Year: 2013).*

(Continued)

*Primary Examiner* — Joseph Brown
(74) *Attorney, Agent, or Firm* — KATTEN MUCHIN ROSENMAN LLP

(57) ABSTRACT

A redundant parallel mechanism with less actuation and multi-degree-of-freedom outputs and a control method thereof are provided, which relate to the field of robot mechanisms. The redundant parallel mechanism includes: a fixed platform, a moving platform, multiple moving branch chains, and one or more redundant branch chains. Two ends of each moving branch chain are respectively connected to the fixed platform and the moving platform, and a brake is arranged on each moving branch chain. Two ends of each redundant branch chain are respectively connected to the fixed platform and the moving platform, and an actuating part is arranged on each redundant branch chain. There are n redundant branch chains arranged. During control, the number of follow-up moving branch chains is set to n, and the n moving branch chains move to expected positions and postures under the control of the n redundant branch chains.

1 Claim, 4 Drawing Sheets

(56) References Cited

U.S. PATENT DOCUMENTS

| | | | | |
|---|---|---|---|---|
| 6,330,837 B1* | 12/2001 | Charles | ................ | B25J 17/0266 901/29 |
| 2010/0313695 A1* | 12/2010 | Valasek | .................. | B25J 9/0072 74/490.08 |
| 2012/0103128 A1* | 5/2012 | Long | .................... | B25J 17/0216 403/132 |
| 2013/0118287 A1* | 5/2013 | Holgate | ................ | B25J 17/0216 901/19 |
| 2014/0263883 A1* | 9/2014 | Rushworth | ......... | F16M 11/2035 248/163.1 |
| 2016/0031080 A1* | 2/2016 | Rey | ...................... | B25J 19/0091 901/22 |
| 2016/0279750 A1* | 9/2016 | Axinte | ................. | B25H 1/0042 |
| 2019/0232485 A1* | 8/2019 | Reese | ................... | A61H 1/0237 |
| 2020/0033211 A1* | 1/2020 | Matich | .................... | G01L 5/162 |

FOREIGN PATENT DOCUMENTS

| | | | | |
|---|---|---|---|---|
| CN | 107538468 B | 7/2020 | | |
| CN | 107471201 B | 9/2020 | | |
| DE | 102017002787 A1 * | 9/2018 | ............. | B25B 11/00 |

OTHER PUBLICATIONS

CN 1586806 A (Wu-yi Chen) Mar. 2, 2005 (full text). [online] [retrieved on Aug. 29, 2023]. Retrieved from: Clarivate Analytics. (Year: 2005).*

* cited by examiner

REDUNDANT PARALLEL MECHANISM WITH LESS ACTUATION AND MULTI-DEGREE-OF-FREEDOM OUTPUTS AND CONTROL METHOD THEREOF

CROSS REFERENCE TO RELATED APPLICATION

This patent application claims the benefit and priority of Chinese Patent Application No. 202110116056.3 filed on Jan. 28, 2021, the disclosure of which is incorporated by reference herein in its entirety as part of the present application.

TECHNICAL FIELD

The present disclosure relates to the technical field of robot mechanisms, and in particular, to a redundant parallel mechanism with less actuation and multi-degree-of-freedom outputs and a control method thereof.

BACKGROUND ART

Parallel mechanisms have the advantages of compact structure, large bearing capacity, high accuracy, and small retrace error and so on, and are widely used in the fields of aerospace, ships, automobiles, etc. In heavy load conditions, redundant branch chains need to be added to improve the bearing capacity of the parallel mechanism, so a redundant actuation parallel mechanism is proposed. For example, a redundant actuation parallel polishing robot with five degrees of freedom disclosed in patent CN201610494181.7 includes a fixed platform, a moving platform, six RUS actuating branches, and one constraint branch. The overall mechanism has the advantages by using a redundant parallel structure as follows: the rigidity is improved, a singularity posture is avoided, and the working space is effectively increased, so as to achieve the effect of improving the quality of a machined surface by the polishing robot. A redundant actuation parallel robot for friction stir welding disclosed in patent CN201610289804.7 includes a moving platform, a machine frame, and four branches connected between the machine frame and the moving platform. The mechanism can perform the spatial motion with three degrees of freedom, which has two rotations and one movement, and has the advantages of high machining precision, high rigidity, simple accompanying motion, etc. A structural redundant parallel robot mechanism with three relative degrees of freedom disclosed in patent CN201710914676.5 includes a base and first to fourth branch chain components; and the mechanism can perform the spatial motion with three degrees of freedom, which has two movements and one rotation, so that the singularity posture of the mechanism is reduced and the force transmission performance of the mechanism is improved. However, the number of the actuators of these mechanisms is greater than the number of degrees of freedom, so they are more difficult to be controlled cooperatively, and engineering application is not easy to realize.

SUMMARY

In order to solve the above technical problem, some embodiments provide a redundant parallel mechanism with less actuation and multi-degree-of-freedom outputs and a control method thereof, which reduces actuating parts, reduces the cost and the control difficulty, and has large bearing capacity.

To achieve the above objective, some embodiments provide the following solution.

The present disclosure provides a redundant parallel mechanism with less actuation and multi-degree-of-freedom outputs, the redundant parallel mechanism including a fixed platform, a moving platform, multiple moving branch chains, and one or more redundant branch chains, where two ends of each of the moving branch chains are respectively connected to the fixed platform and the moving platform, and a brake is arranged on each of the moving branch chains; and two ends of each of the one or more redundant branch chains are respectively connected to the fixed platform and the moving platform, and an actuating part is arranged on each of the one or more redundant branch chains.

Preferably, each of the one or more redundant branch chains includes a first connecting piece, a first upper connecting rod, a second connecting piece, a first lower connecting rod, and a third connecting piece connected in sequence from top to bottom; an upper end of the first upper connecting rod is connected to the moving platform through the first connecting piece; and a lower end of the first lower connecting rod is connected to the fixed platform through the third connecting piece.

Preferably, each of the moving branch chains includes a fourth connecting piece, a second upper connecting rod, a fifth connecting piece, a second lower connecting rod, and a sixth connecting piece connected in sequence from top to bottom; an upper end of the second upper connecting rod is connected to the moving platform through the fourth connecting piece; and a lower end of the second lower connecting rod is connected to the fixed platform through the sixth connecting piece.

Preferably, both the first connecting piece and the third connecting piece are spherical joints; the second connecting piece is a prismatic joint; the actuating part is mounted on the second connecting piece; and the actuating part is a linear actuating unit.

Preferably, both the fourth connecting piece and the sixth connecting piece are spherical joints; the fifth connecting piece is a prismatic joint; the brake is mounted on the fifth connecting piece.

Preferably, the fourth connecting piece is a spherical joint; the fifth connecting piece is a prismatic joint; the sixth connecting piece is a revolute joint; and the brake is mounted on the fifth connecting piece.

Preferably, the redundant parallel mechanism with less actuation and multi-degree-of-freedom outputs according to claim , further including a constraint branch chain, where a lower end of the constraint branch chain is fixedly connected to a center of the fixed platform; an upper end of the constraint branch chain is connected to a center of the moving platform through an universal joint; both the first connecting piece and the fourth connecting piece are spherical joints; both the second connecting piece and the fifth connecting pieces are universal joints; both the third connecting piece and the sixth connecting piece are revolute joints; the actuating part is mounted on the third connecting piece; the actuating part is a rotary actuating unit; and the brake is mounted on the sixth connecting piece.

The present disclosure further provides a control method for the redundant parallel mechanism with less actuation and multi-degree-of-freedom outputs, the control method including: enabling the one or more redundant branch chains to include n redundant branch chains, releasing the brake of each of first n moving branch chains of the moving branch chains, such that the first n moving branch chains are in a follow-up state; locking the brake of each of other moving branch chains of the moving branch chains, such that the other moving branch chains are in a locked state; and adjusting displacements of the first n moving branch chains by controlling an actuating input of the n redundant branch chains; enabling n+1th to 2nth moving branch chains of the moving branching chains to be in the follow-up state, and locking remaining moving branch chains, adjusting displacements of the n+1th to 2nth moving branch chains by controlling the actuating input of the n redundant branch chains; enabling adjustments of the moving branch chains to be realized by repeating above steps.

Compared with the prior art, some embodiments achieve the following technical effects.

According to the redundant parallel mechanism with less actuation and multi-degree-of-freedom outputs and a control method thereof provided by the present disclosure, the redundant parallel mechanism with less actuation and multi-degree-of-freedom outputs includes: a fixed platform, a moving platform, multiple moving branch chains, and one or more redundant branch chains. Two ends of each moving branch chain are respectively connected to the fixed platform and the moving platform, and the brake is arranged on each moving branch chain. The two ends of each redundant branch chain are respectively connected to the fixed platform and the moving platform, and the actuating part is arranged on each redundant branch chain. The number of the redundant branch chains is set to n, during control, the number of follow-up moving branch chains is set to n. Except for the follow-up moving branch chains, the other moving branch chains are locked by the respective brakes. The n follow-up moving branch chains move to expected positions and postures under the control of the n redundant branch chains. Through multiple adjustments, all moving branch chains move to the expected positions and postures. That is, the control of the outputs of all expected degrees of freedom of the parallel mechanism can be realized. It can be seen that the redundant parallel mechanism of some embodiments has large bearing capacity, the actuating parts thereof are decreased, the cost thereof is reduced, thereby realizing multidimensional independent outputs through multiple actuating, further realizing the adjustment of the position and posture of the mechanism, and simplifying the control of a redundant parallel mechanism. Therefore, the mechanism has a very broad application prospect.

BRIEF DESCRIPTION OF THE DRAWINGS

In order to more clearly illustrate technical solutions in the embodiments of the present application or in the prior art, a brief introduction to the accompanying drawings required for the embodiment will be provided below. Obviously, the accompanying drawings in the following description are only some of the embodiments of the present disclosure. Those of ordinary skill in the art would also be able to derive other drawings from these drawings without making creative efforts.

Figure 1:
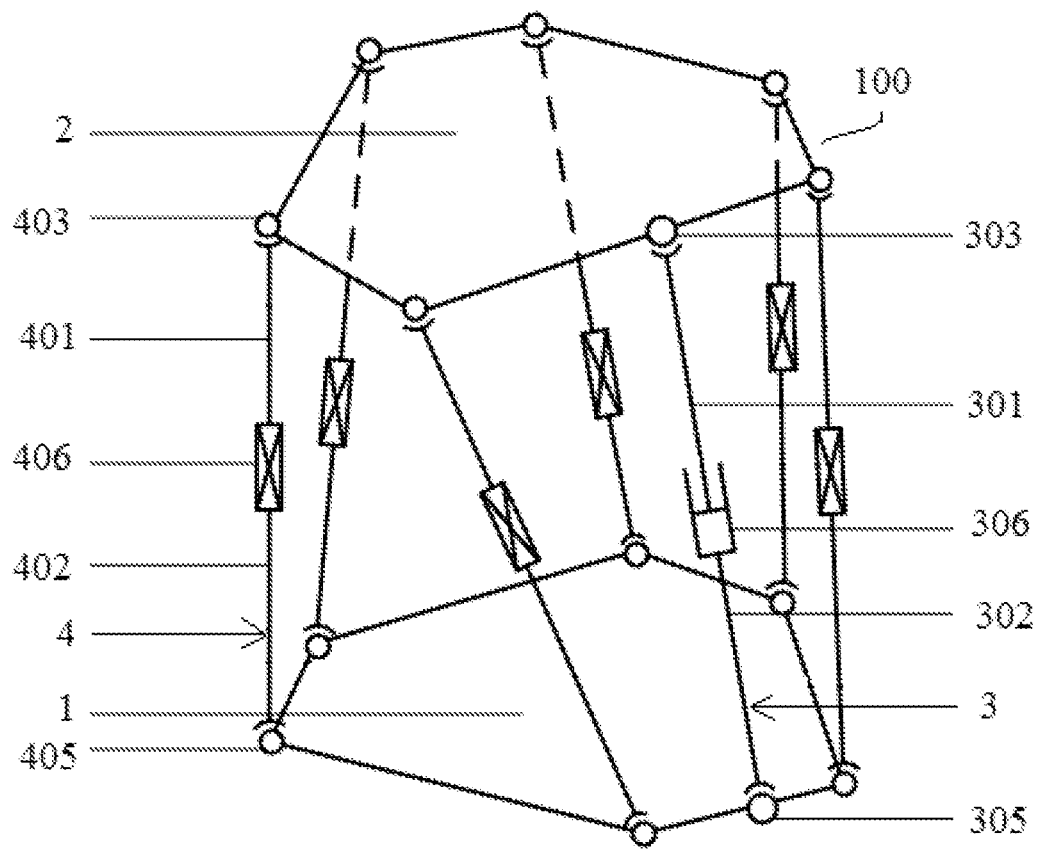
FIG. 1 is a schematic structural diagram of Embodiment 1 of a redundant parallel mechanism with less actuation and multi-degree-of-freedom outputs provided by the present disclosure.

Reference signs in the drawings: 100 redundant parallel mechanism with less actuation and multi-degree-of-freedom outputs; 1 fixed platform; 2 moving platform; 3 redundant branch chain; 301 first upper connecting rod; 302 first lower connecting rod; 303 first connecting piece; 304 second connecting piece; 305 third connecting piece; 306 actuating part; 4 moving branch chain; 401 second upper connecting rod; 402 second lower connecting rod; 403 fourth connecting piece; 404 fifth connecting piece; 405 sixth connecting piece; 406 brake; and 5 constraint branch chain.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments of the present invention, all other embodiments obtained by those of ordinary skill in the art without creative work shall fall within the protection scope of the present invention.

An objective of some embodiment is to provide a redundant parallel mechanism with less actuation and multi-degree-of-freedom outputs and a control method thereof, which reduces actuating parts, reduces the cost, reduces the control difficulty, and has large bearing capacity.

In order to make the objectives, features, and advantages mentioned above of the present disclosure more apparent and easily understood, the present disclosure will be further described in detail below with reference to the drawings and particular implementations.

Embodiment 1

As shown in FIG. 1, the present embodiment provides a redundant parallel mechanism with less actuation and multi-degree-of-freedom outputs 100, including: a fixed platform 1, a moving platform 2, multiple moving branch chains 4, and one or more redundant branch chains 3. Two ends of each moving branch chain 4 are respectively connected to the fixed platform 1 and the moving platform 2, and a brake 406 is arranged on each moving branch chain 4. Two ends of each redundant branch chain 3 are respectively connected to the fixed platform 1 and the moving platform 2, and an actuating part 306 is arranged on each redundant branch chain 3. Specifically, the number of the moving branch chains 4 is greater than that of the redundant branch chains 3. It can be seen that, in the present embodiment, based on a normal non-redundant parallel mechanism, one or more (denoted as n) redundant branch chains 3 are added to construct a redundant parallel mechanism. The actuating part 306 is added to each of the added redundant branch chains 3, and an actuating joint on each original branch chain of the normal non-redundant parallel mechanism is replaced with the brake 406, so that the original branch chains become the moving branch chains 4 that can be locked or follow up.

The number of the redundant branch chains 3 is set to n. During control, the number of follow-up moving branch chains 4 is set to n. Excepting for the follow-up moving branch chains 4, the other moving branch chains 4 are locked by the respective brakes. The n follow-up moving branch chains move to expected positions and postures under the control of the n redundant branch chains 3, specifically, under the control of the actuating parts 306. Through multiple adjustments, all moving branch chains 4 move to the expected positions and postures. That is, the control of the outputs of all expected degrees of freedom of the parallel mechanism can be realized. It can be seen that the redundant parallel mechanism of some embodiments has large bearing capacity, the actuating parts 306 thereof are decreased, the cost thereof is reduced, thereby realizing multidimensional independent outputs through multiple actuating, further realizing the adjustment of the position and posture of the mechanism, reducing the control difficulty and simplifying the control of a redundant parallel mechanism. Therefore, the mechanism has a very broad application prospect.

Specifically, the redundant branch chain 3 includes a first connecting piece 303, a first upper connecting rod 301, a second connecting piece 304, a first lower connecting rod 302, and a third connecting piece 305 connected in sequence from top to bottom. The upper end of the first upper connecting rod 301 is connected to the moving platform 2 through the first connecting piece 303. The lower end of the first lower connecting rod 302 is connected to the fixed platform 1 through the third connecting piece 305.

Specifically, the moving branch chain 4 includes a fourth connecting piece 403, a second upper connecting rod 401, a fifth connecting piece 404, a second lower connecting rod 402, and a sixth connecting piece 405 connected in sequence from top to bottom. The upper end of the second upper connecting rod 401 is connected to the moving platform 2 through the fourth connecting piece 403. The lower end of the second lower connecting rod 402 is connected to the fixed platform 1 through the sixth connecting piece 405.

The present embodiment further provides a control method for the redundant parallel mechanism with less actuation and multi-degree-of-freedom outputs 100, including the following steps: n redundant branch chains 3 are provided. Firstly, the brakes 406 on the first n moving branch chains 4 are released, so that the first n moving branch chains 4 is in the follow-up state, and the brakes 406 of the other moving branch chains 4 are locked, so that the other moving branch chains 4 are in a locked state. And, the displacements of the first n moving branch chains 4 are able to be adjusted by controlling the actuating input of the n redundant branch chains 3. Then, the n+1th to 2nth moving branch chains 4 are set to in the follow-up state, and the remaining moving branch chains 4 are locked, so that the displacements of the n+1th to 2nth moving branch chains 4 are able to be adjusted by controlling the actuating input of the n redundant branch chains 3. And thus, the adjustments of all moving branch chains 4 can be realized by repeating above steps.

In the present specific embodiment, both the first connecting piece 303 and the third connecting piece 305 are spherical joints. The second connecting piece 304 is a prismatic joint. The actuating part 306 is mounted on the second connecting piece 304. The actuating part 306 is a linear actuating unit. That is to say, the redundant branch chain 3 in the present embodiment is an SPS (Spherical-Prismatic-Spherical) redundant branch chain, and the actuating part 306 is added to a prismatic joint of the redundant branch chain 3. The lower end of the first upper connecting rod 301 is connected to the upper end of the first lower connecting rod 302 through the prismatic joint. The upper end of the first upper connecting rod 301 and the lower end of the first lower connecting rod 302 are respectively connected to the moving platform 2 and the fixed platform 1 through spherical joints. The linear actuating unit is mounted on a prismatic joint of the redundant branch chain 3. Specifically, the linear actuating unit is a linear motor or a hydraulic cylinder.

In the present specific embodiment, both the fourth connecting piece 403 and the sixth connecting piece 405 are spherical joints. The fifth connecting piece 404 is a prismatic joint. The brake 406 is mounted on the fifth connecting piece 404. That is, the moving branch chain 4 in the present embodiment is an SPS moving branch chain. A controllable brake 406 is added to the prismatic joint of the moving branch chain 4, so that the moving branch chain can be locked or follow up. The lower end of the second upper connecting rod 401 is connected to the upper end of the second lower connecting rod 402 through the prismatic joint. The upper end of the second upper connecting rod 401 and the lower end of the second lower connecting rod 402 are respectively connected to the moving platform 2 and the fixed platform 1 through a spherical joint. The brake 406 is mounted on a prismatic joint of motion branch chain 4.

In the specific embodiment, six moving branch chains 4 are provided, and one redundant branch chain 3 is provided, so as to form a 7-SPS parallel mechanism with a single actuation and six-degrees-of-freedom outputs.

A specific control process is as follows. The brake 406 on a first moving branch chain 4 is released, and the brakes 406 on the other five moving branch chains 4 are locked. The first moving branch chain 4 follows up the redundant branch chain 3 by controlling the actuating input of the redundant branch chain 3, and the first moving branch chain 4 can be controlled to reach a predetermined position. The brake 406 on a second moving branch chain 4 is released, and the brakes 406 on the other five moving branch chains 4 are locked. The second moving branch chain 4 follows up the redundant branch chain 3 by controlling the actuating input of the redundant branch chain 3, and the second moving branch chain 4 can be controlled to reach a predetermined position. By repeating the above steps six times, the mechanism may be controlled to reach the predetermined position.

Embodiment 2

Figure 2:
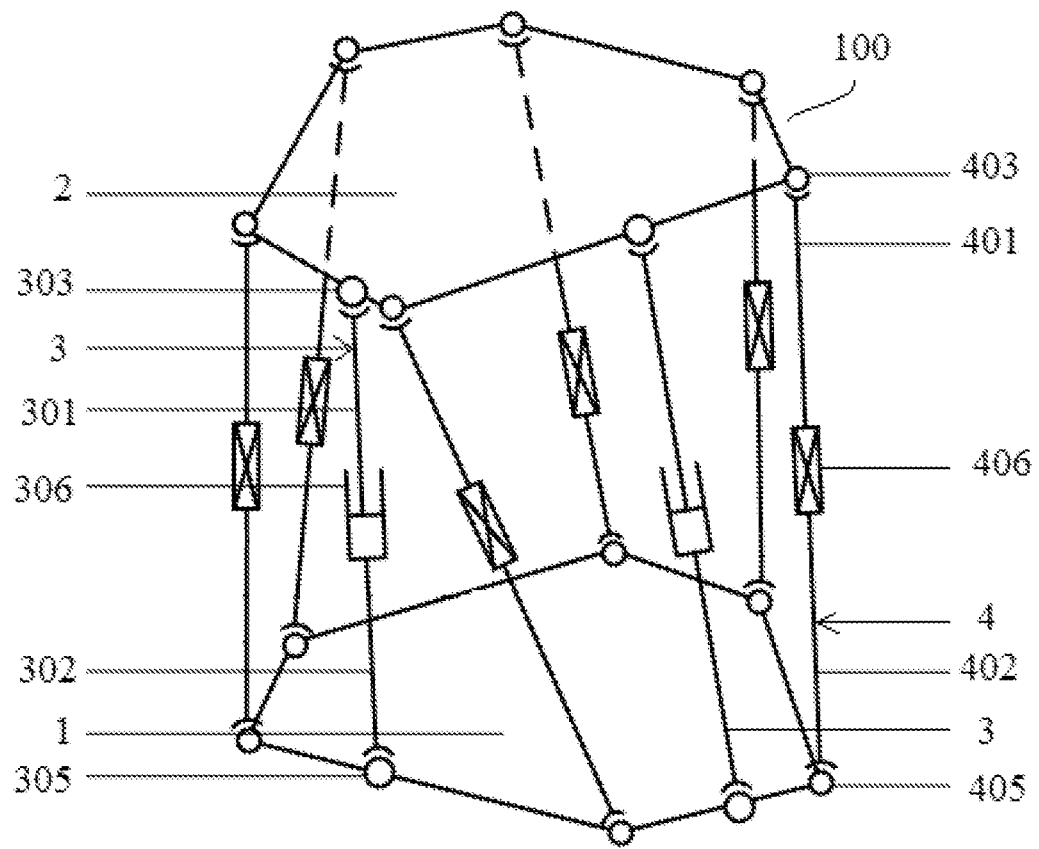
FIG. 2 is a schematic structural diagram of Embodiment 2 of a redundant parallel mechanism with less actuation and multi-degree-of-freedom outputs provided by the present disclosure.

As shown in FIG. 2, difference between the Embodiment 2 and Embodiment 1 is the number of the redundant branch chains 3. Specifically, there are two redundant branch chains 3 arranged in the Embodiment 2 to form an 8-SPS parallel mechanism with two actuations and six-degrees-of-freedom outputs.

A specific control process is as follows. The brakes 406 on the first and second moving branch chain 4 are released, and the brakes 406 on the other four moving branch chains 4 are locked. The first and second moving branch chains 4 follow up the two redundant branch chains 3 by controlling the actuating input of the two redundant branch chains 3, and the first and second moving branch chains 4 can be controlled to reach predetermined positions. The brakes 406 on the third and fourth moving branch chains 4 are released, and the brakes 406 on the other four moving branch chains 4 are locked. The third and fourth moving branch chains 4 follow up the two redundant branch chains 3 by controlling the actuating input of the two redundant branch chains 3, and the third and fourth moving branch chains 4 can be controlled to reach predetermined positions. By repeating the above steps three times, the mechanism may be controlled to reach the predetermined position.

Embodiment 3

Figure 3:
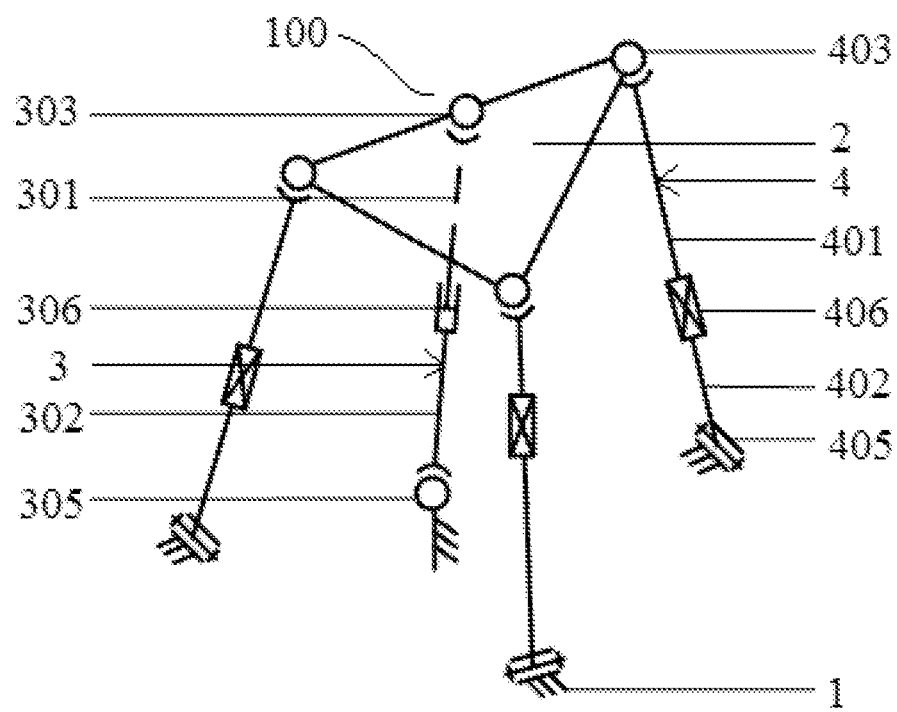
FIG. 3 is a schematic structural diagram of Embodiment 3 of a redundant parallel mechanism with less actuation and multi-degree-of-freedom outputs provided by the present disclosure.

As shown in FIG. 3, the difference between the Embodiment 3 and Embodiment 1 is the specific structure and the number of the moving branch chains 4. Specifically, the fourth connecting piece 403 is a spherical joint. The fifth connecting piece 404 is a prismatic joint. The sixth connecting piece 405 is a revolute joint. The brake 406 is mounted on the fifth connecting piece 404. That is, the moving branch chain 4 in the Embodiment 3 is an RPS (Revolute-Prismatic-Spherical) moving branch chain. A controllable brake 406 is added to the prismatic joint of the moving branch chain 4, so that the moving branch chain can be locked or follow up the redundant branch chain 3. The lower end of the second upper connecting rod 401 is connected to the upper end of the second lower connecting rod 402 through the prismatic joint. The upper end of the second upper connecting rod 401 is connected to the moving platform 2 through a spherical joint. The lower end of the second lower connecting rod 402 is connected to the fixed platform 1 through the revolute joint. The brake 406 is mounted on the prismatic joint of the moving branch chain 4.

In the Embodiment 3, three moving branch chains 4 are provided, and one redundant branch chain 3 is provided, so as to form a 3-RPS-SPS parallel mechanism with a single actuation and two-rotation and one-movement outputs.

A specific control process is as follows. The brake 406 on the first moving branch chain 4 is released, and the brakes 406 on the other two moving branch chains 4 are locked. The first moving branch chain 4 follows up the redundant branch chain 3 by controlling the actuating input of the redundant branch chain 3, and the first moving branch chain 4 can be controlled to reach a predetermined position. The brake 406 on the second moving branch chain 4 is released, and the brakes 406 on the other two moving branch chains 4 are locked. The second moving branch chain 4 follows up the redundant branch chain 3 by controlling the actuating input of the redundant branch chain 3, and the second moving branch chain 4 can be controlled to reach a predetermined position. By repeating the above steps three times, the mechanism may be controlled to reach the predetermined position.

Embodiment 4

Figure 4:
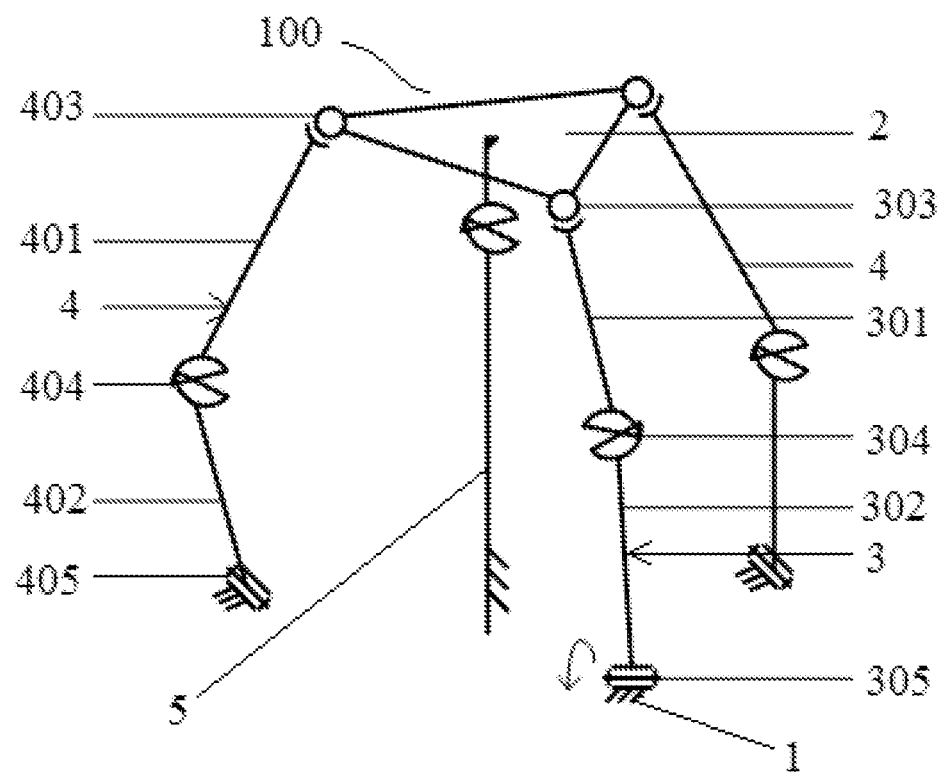
FIG. 4 is a schematic structural diagram of Embodiment 4 of a redundant parallel mechanism with less actuation and multi-degree-of-freedom outputs provided by the present disclosure.

As shown in FIG. 4, the difference between the Embodiment 4 and Embodiment 1 is the structure and the number of the moving branch chains 4, and the structure of the redundant branch chain 3. Specifically, this Embodiment further includes a restraint branch chain 5. The lower end of the restraint branch chain 5 is fixedly connected to the center of the fixed platform 1. The upper end of the constraint branch chain 5 is connected to the center of the moving platform 2 through an universal joint. Both the first connecting piece 303 and the fourth connecting piece 403 are spherical joints. Both the second connecting piece 304 and the fifth connecting pieces 404 are universal joints. Both the third connecting piece 305 and the sixth connecting piece 405 are revolute joints. The actuating part 306 is mounted on the third connecting piece 305. The actuating part 306 is a rotary actuating unit. The brake 406 is mounted on the sixth connecting piece 405.

Specifically, the lower end of the first upper connecting rod 301 is connected to the upper end of the first lower connecting rod 302 through an universal joint. The upper end of the first upper connecting rod 301 is connected to the moving platform 2 through the spherical joint. The lower end of the first lower connecting rod 302 is connected to the fixed platform 1 through the revolute joint. The rotary actuating unit is mounted on the revolute joint of the redundant branch chain 3. The lower end of the second upper connecting rod 401 is connected to the upper end of the second lower connecting rod 402 through an universal joint. The upper end of the second upper connecting rod 401 is connected to the moving platform 2 through a spherical joint. The lower end of the second lower connecting rod 402 is connected to the fixed platform 1 through the revolute joint. The brake 406 is mounted on the revolute joint of the moving branch chain 4. That is, the redundant branch chain 3 in the Embodiment 4 is a RUS (Revolute-Universal-Spherical) redundant branch chain. A rotary actuating unit is added to the revolute joint of the redundant branch chain 3. The moving branch chains 4 are RUS moving branch chains. A controllable brake 406 is added on each of the revolute joints of the moving branch chains 4, so that the moving branch chains can be locked or follow up the redundant branch chain 3. Meanwhile, in the Embodiment 4, a restraint branch chain with an universal joint is further included. Specifically, the rotary actuating unit is a rotary motor.

In the Embodiment 4, two moving branch chains 4 are provided, one redundant branch chain 3 is provided, and one restraint branch chain 5 is provided, so as to form a 3-RUS-U parallel mechanism with a single actuation and two-rotation outputs.

A specific control process is as follows. The brake 406 on the first moving branch chain 4 is released, and the brake 406 on the second moving branch chain 4 is locked. The first moving branch chain 4 follows up the redundant branch chain 3 by controlling the actuating input of the redundant branch chain 3, and the first moving branch chain 4 can be controlled to reach a predetermined position. The brake 406 on the second moving branch chain 4 is released, and the brake 406 on the first moving branch chain 4 is locked. The second moving branch chain 4 follows up the redundant branch chain 3 by controlling the actuating input of the redundant branch chain 3, and the second moving branch chain 4 can be controlled to reach a predetermined position. That is, the mechanism may be controlled to reach the predetermined position.

It should be noted that, in addition to the three types of parallel mechanisms in the Embodiment 1 to Embodiment 4, the redundant parallel mechanisms with less actuation and multiple outputs, which are formed on the basis of other types of parallel mechanisms by similar methods, are within the scope of protection of the disclosure.

Specific embodiments are used in this specification for illustration of the principles and implementations of the present disclosure. The description of the above embodiments is merely used to help understand the method and core concept of the present disclosure. In addition, those of ordinary skill in the art may make modifications to the specific implementations and application scope in accordance with the concept of the present disclosure. In conclusion, the content of this specification should not be construed as a limitation to the present disclosure.

What is claimed is:

1. A redundant parallel mechanism with less actuation and multi-degree-of-freedom outputs, the redundant parallel mechanism comprising:

a fixed platform, a moving platform, a plurality of moving branch chains, and one or more redundant branch chains, wherein two ends of each of the moving branch chains are respectively connected to the fixed platform and the moving platform, and a brake is arranged on each of the moving branch chains; and two ends of each of the one or more redundant branch chains are respectively connected to the fixed platform and the moving platform, and an actuating part is arranged on each of the one or more redundant branch chains, wherein a number of the moving branch chains is greater than a number of the one or more redundant branch chains; the moving branch chains are able to be locked or follow up, and the follow-up moving branch chains are able to move to expected positions and postures under a control of at least one of the redundant branch chains; the moving branch chains are configured to be displaced by controlling an actuating input of the one or more redundant branch chains;

wherein each of the one or more redundant branch chains comprises a first connecting piece, a first upper connecting rod, a second connecting piece, a first lower connecting rod, and a third connecting piece connected in sequence from top to bottom; an upper end of the first upper connecting rod is connected to the moving platform through the first connecting piece; and a lower end of the first lower connecting rod is connected to the fixed platform through the third connecting piece;

wherein each of the moving branch chains comprises a fourth connecting piece, a second upper connecting rod, a fifth connecting piece, a second lower connecting rod, and a sixth connecting piece connected in sequence from top to bottom; an upper end of the second upper connecting rod is connected to the moving platform through the fourth connecting piece; and a lower end of the second lower connecting rod is connected to the fixed platform through the sixth connecting piece;

wherein both the first connecting piece and the third connecting piece are spherical joints;

the second connecting piece is a prismatic joint the actuating part is mounted on the second connecting piece; and the actuating part is a linear actuating unit and wherein both the fourth connecting piece and the sixth connecting piece are spherical joints;

the fifth connecting piece is a prismatic joint; the brake is mounted on the fifth connecting piece.

* * * * *